US012692574B2

(12) United States Patent
Kim et al.

(10) Patent No.: US 12,692,574 B2
(45) **Date of Patent: *Jul. 28, 2026**

(54) NON-ORIENTED ELECTRICAL STEEL SHEET, AND METHOD FOR MANUFACTURING SAME

(71) Applicant: LG ELECTRONICS INC., Seoul (KR)

(72) Inventors: Yunsung Kim, Seoul (KR); Jin Bae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/267,689

(22) PCT Filed: Nov. 9, 2021

(86) PCT No.: PCT/KR2021/016276

§ 371 (c)(1),
(2) Date: Jun. 15, 2023

(87) PCT Pub. No.: WO2022/131553

PCT Pub. Date: Jun. 23, 2022

(65) Prior Publication Data

US 2024/0102122 A1 Mar. 28, 2024

(30) Foreign Application Priority Data

Dec. 15, 2020 (KR) ........................ 10-2020-0175663
Dec. 15, 2020 (KR) ........................ 10-2020-0175664

(51) Int. Cl.

| | |
|---|---|
| ***C21D 9/46*** | (2006.01) |
| ***C21D 1/74*** | (2006.01) |
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/16*** | (2006.01) |
| ***C22C 38/34*** | (2006.01) |
| ***C22C 38/42*** | (2006.01) |
| ***H01F 1/147*** | (2006.01) |

(52) U.S. Cl.

CPC ................. *C21D 9/46* (2013.01); *C21D 1/74* (2013.01); *C21D 6/001* (2013.01); *C21D 6/004* (2013.01); *C21D 6/005* (2013.01); *C21D 6/008* (2013.01); *C21D 8/1222* (2013.01); *C21D 8/1233* (2013.01); *C21D 8/1255* (2013.01); *C21D 8/1272* (2013.01); *C21D 8/1277* (2013.01); *C21D 8/1283* (2013.01); *C22C 38/002* (2013.01); *C22C 38/02* (2013.01); *C22C 38/04* (2013.01); *C22C 38/06* (2013.01); *C22C 38/08* (2013.01); *C22C 38/16* (2013.01); *C22C 38/34* (2013.01); *C22C 38/42* (2013.01); *H01F 1/14783* (2013.01); *C22C 2202/02* (2013.01)

(58) Field of Classification Search

CPC ........................................................ C21D 9/46
See application file for complete search history.

(56) References Cited

U.S. PATENT DOCUMENTS

| | | | | |
|---|---|---|---|---|
| 4,046,602 | A * | 9/1977 | Stanley | C21D 8/12 148/112 |
| 4,898,627 | A | 2/1990 | Schoen | |
| 6,406,558 | B1 * | 6/2002 | Kurosawa | C22C 38/008 148/120 |
| 2005/0000596 | A1 | 1/2005 | Schoen et al. | |
| 2007/0023103 | A1 | 2/2007 | Schoen et al. | |
| 2013/0263981 | A1 * | 10/2013 | Zaizen | C22C 38/60 148/645 |
| 2015/0357101 | A1 | 12/2015 | Zaizen et al. | |
| 2018/0094331 | A1 | 4/2018 | Zhang et al. | |

(Continued)

FOREIGN PATENT DOCUMENTS

| | | |
|---|---|---|
| CN | 101 275 198 | 10/2008 |
| CN | 104789862 | 7/2015 |

(Continued)

OTHER PUBLICATIONS

International Search Report dated Mar. 21, 2022 issued in Application No. PCT/KR2021/016276.

(Continued)

*Primary Examiner* — Jophy S. Koshy

(74) *Attorney, Agent, or Firm* — KED & ASSOCIATES, LLP

(57) ABSTRACT

Disclosed are a non-oriented electrical steel sheet and a method for manufacturing same, wherein the texture of the electrical steel sheet is optimized after cold rolling by controlling the temperature and atmosphere of decarburization annealing and final annealing, and thus excellent iron loss can be obtained even at low temperatures. In addition, disclosed are a non-oriented electrical steel sheet and a method for manufacturing same, wherein processes, from the processing of the electrical steel sheet into motor component to a final heat-treatment, are improved to enhance the strength of the texture aligned in the direction of easy magnetization and thereby improve the magnetic characteristics of the steel sheet.

12 Claims, 7 Drawing Sheets

(56) References Cited

U.S. PATENT DOCUMENTS

| | | | | |
|---|---|---|---|---|
| 2020/0063229 | A1 | 2/2020 | Fischer et al. | |
| 2022/0154304 | A1* | 5/2022 | Takahashi | H01F 1/147 |
| 2022/0396848 | A1* | 12/2022 | Kim | H01F 1/14775 |

FOREIGN PATENT DOCUMENTS

| | | |
|---|---|---|
| JP | 2002 371340 | 12/2002 |
| JP | 4 329550 | 9/2009 |
| JP | 2017-040002 | 2/2017 |
| KR | 10-1994-0009347 | 5/1994 |
| KR | 10-1995-0004934 | 5/1995 |
| KR | 10-1998-0044903 | 9/1998 |
| KR | 10-2012-0035212 | 4/2012 |
| KR | 10-2015-0093807 | 8/2015 |
| WO | WO 93/08313 | 4/1993 |
| WO | WO 2020/188812 | 9/2020 |

OTHER PUBLICATIONS

European Search Report dated Mar. 21, 2025, issued in Application No. 21906858.2.

* cited by examiner

| EBSD (COMPARATIVE EXAMPLE 1) | |
|---|---|
| ODF | IPF Map |
|   |  |

| EBSD (COMPARATIVE EXAMPLE 3) | |
|---|---|
| ODF | IPF Map |
|   |  |

<table>
<tr><th colspan="2">EBSD (PRESENT EXAMPLE 1)</th></tr>
<tr><th>ODF</th><th>IPF Map</th></tr>
<tr><td>
</td><td></td></tr>
</table>

<table>
<tr><th colspan="2">EBSD (COMPARATIVE EXAMPLE 5)</th></tr>
<tr><th>ODF</th><th>IPF Map</th></tr>
<tr><td>
</td><td></td></tr>
</table>

NON-ORIENTED ELECTRICAL STEEL SHEET, AND METHOD FOR MANUFACTURING SAME

CROSS-REFERENCE TO RELATED PATENT APPLICATIONS

This application is a U.S. National Stage Application under 35 U.S.C. § 371 of PCT Application No. PCT/KR2021/016276, filed Nov. 9, 2021, which claims priority to Korean Patent Application Nos. 10-2020-0175663 and 10-2020-175664, both filed Dec. 15, 2020, whose entire disclosures are hereby incorporated by reference.

FIELD

The present disclosure relates to a non-oriented electrical steel sheet and a method for manufacturing the same.

DESCRIPTION OF RELATED ART

An electrical steel sheet may be classified into an oriented electrical steel sheet and a non-oriented electrical steel sheet based on magnetic properties thereof.

The oriented electrical steel sheet is manufactured to facilitate magnetization in a rolling direction of the steel sheet and thus have particularly excellent magnetic properties in the rolling direction, so that the oriented electrical steel sheet is mainly used as an iron core for large and small and medium-sized transformers requiring low iron loss and high magnetic permeability.

In contrast, the non-oriented electrical steel sheet has uniform magnetic properties regardless of an orientation of the steel sheet. Accordingly, the non-oriented electrical steel sheet is mainly used as an iron core for a linear compressor motor, an air conditioner compressor motor, and a high-speed motor for a vacuum cleaner.

Recently, according to a trend of increasing an efficiency of an electrical device and miniaturizing the electrical device in terms of energy saving, research is being conducted to minimize the iron loss even in the non-oriented electrical steel sheet.

PRIOR ART LITERATURE

Patent Literature (Patent Document 1) Korean Patent Application Publication No. 10-1994-0009347 (published on May 20, 1994)

DISCLOSURE

Technical Purposes

The present disclosure is to provide a non-oriented electrical steel sheet and a method for manufacturing the same that may secure low iron loss even at a low temperature by adjusting temperatures and atmospheres of a decarburization annealing heat-treatment and a final annealing heat-treatment after cold rolling to optimize texture of the electrical steel sheet.

In addition, the present disclosure is to provide a non-oriented electrical steel sheet that is cost-effective and has low iron loss and a method for manufacturing the same by lowering a decarburization annealing heat-treatment temperature from a temperature equal to or higher than 1,000° C. to a temperature in a range from 780 to 920° C., more preferably in a range from 780 to 820° C. during a decarburization annealing heat-treatment in a $H_2$ gas atmosphere to increase a fraction of non-recrystallized grains to increase a possibility of change of texture, and performing a final annealing heat-treatment in an Ar gas atmosphere at a temperature in a range from 980 to 1,020° C.

In addition, the present disclosure is to provide a non-oriented electrical steel sheet and a method for manufacturing the same that may lower a decarburization annealing heat-treatment temperature to a temperature in a range from 780 to 920° C. to reduce a process cost, and reduce a degree of risk of oxidation to lower a defect rate.

The present disclosure is to provide a non-oriented electrical steel sheet and a method for manufacturing the same that may improve a process up to a final heat-treatment after the electrical steel sheet is processed into parts for a motor to increase a strength of texture aligned in a direction of facilitating magnetization, and accordingly, improve magnetic properties.

In addition, the present disclosure is to provide a non-oriented electrical steel sheet and a method for manufacturing the same that improve magnetic properties of the electrical steel sheet while increasing a strength in a (100) direction by performing a recrystallization heat-treatment at a low temperature equal to or lower than 900° C. instead of performing a final annealing heat-treatment process that is performed at a high temperature equal to or higher than 1,000° C. after cold rolling, and performing a final heat-treatment at a high temperature equal to or higher than 900° C. after processing the steel sheet into parts for a motor.

In addition, the present disclosure is to provide a non-oriented electrical steel sheet and a method for manufacturing the same that may reduce an iron loss while reducing a process cost by lowering a recrystallization heat-treatment temperature to a temperature in a range from 750 to 850° C., and allowing a final heat-treatment duration to be performed at a temperature in a range from 900 to 1,100° C. for a reduced duration in a range from 1 to 30 minutes.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

Technical Solutions

A non-oriented electrical steel sheet according to Embodiment 1 of the present disclosure and a method for manufacturing the same may adjust temperatures and atmospheres of a decarburization annealing heat-treatment and a final annealing heat-treatment after cold rolling to optimize texture of the electrical steel sheet, thereby securing low iron loss even at a low temperature.

In addition, a non-oriented electrical steel sheet according to Embodiment 1 of the present disclosure and a method for manufacturing the same may lower a decarburization annealing heat-treatment temperature from a temperature equal to or higher than 1,000° C. to a temperature in a range from 780 to 920° C., more preferably from 780 to 820° C. during a decarburization annealing heat-treatment in a $H_2$ gas atmosphere to increase a fraction of non-recrystallized grains to increase a possibility of change of texture, and perform a final annealing heat-treatment in an Ar gas atmosphere at a temperature in a range from 980 to 1,020° C., so that an electrical steel sheet that is cost-effective and has low iron loss may be manufactured.

As a result, the non-oriented electrical steel sheet according to Embodiment 1 of the present disclosure and the method for manufacturing the same may adjust the temperatures and the gas atmospheres of the decarburization annealing heat-treatment and the final annealing heat-treatment after the cold rolling to optimize the texture of the electrical steel sheet, thereby securing an iron loss (W15/50) in a range from 1.65 to 2.15 W/kg and a magnetic flux density (B50) in a range from 1.65 to 1.80 T even at the low temperature.

To this end, a non-oriented electrical steel sheet according to Embodiment 1 of the present disclosure contains C: equal to or smaller than 0.05 wt %, Si: in a range from 1.0 to 3.5 wt %, Al: in a range from 0.2 to 0.6 wt %, Mn: in a range from 0.02 to 0.20 wt %, P: in a range from 0.01 to 0.20 wt %, S: equal to or smaller than 0.01 wt %, and Fe as a remainder, and unavoidable impurities.

In addition, the non-oriented electrical steel sheet according to Embodiment 1 of the present disclosure may further contain at least one selected from a group consisting of Cu: equal to or smaller than 0.03 wt %, Ni: equal to or smaller than 0.03 wt %, Cr: equal to or smaller than 0.05 wt %, and S: equal to or smaller than 0.01 wt %.

In this regard, the non-oriented electrical steel sheet according to Embodiment 1 of the present disclosure may have a thickness in a range from 0.05 to 0.50 mm.

In addition, the non-oriented electrical steel sheet according to Embodiment 1 of the present disclosure may have a tensile strength in a range from 400 to 560 N/mm$^2$ and a hardness in a range from 200 to 270 Hv.

On the other hand, a non-oriented electrical steel sheet according to Embodiment 2 of the present disclosure and a method for manufacturing the same improved magnetic properties of the electrical steel sheet while increasing a strength in a (100) direction by performing a recrystallization heat-treatment at a low temperature equal to or lower than 900° C. instead of performing a final annealing heat-treatment process that is performed at a high temperature equal to or higher than 1,000° C. after cold rolling, and performing a final heat-treatment at a high temperature equal to or higher than 900° C. after processing the electrical steel sheet into parts for a motor.

As a result, the non-oriented electrical steel sheet according to Embodiment 2 of the present disclosure and a method for manufacturing the same may perform the recrystallization heat-treatment at the low temperature equal to or lower than 900° C. after the cold rolling, thereby increasing a strength of a (100)-plane, which is a crystalline structure of the non-oriented electrical steel sheet, and thus, improving the magnetic properties.

In addition, the non-oriented electrical steel sheet according to Embodiment 2 of the present disclosure and the method for manufacturing the same may lower the recrystallization heat-treatment temperature to a temperature in a range from 750 to 850° C. and allow the final heat-treatment to be performed at a temperature in a range from 900 to 1,100° C. for a reduced duration in a range from 1 to 30 minutes, thereby reducing an iron loss while reducing a process cost.

To this end, a non-oriented electrical steel sheet according to Embodiment 2 of the present disclosure contains C: equal to or smaller than 0.05 wt %, Si: in a range from 1.0 to 3.5 wt %, Al: in a range from 0.2 to 0.6 wt %, Mn: in a range from 0.02 to 0.20 wt %, P: in a range from 0.01 to 0.20 wt %, S: equal to or smaller than 0.01 wt %, and Fe as a remainder, and unavoidable impurities.

In addition, the non-oriented electrical steel sheet according to Embodiment 2 of the present disclosure may further contain at least one selected from a group consisting of Cu: equal to or smaller than 0.03 wt %, Ni: equal to or smaller than 0.03 wt %, and Cr: equal to or smaller than 0.05 wt %.

As a result, the non-oriented electrical steel sheet according to Embodiment 2 of the present disclosure may have an iron loss (W15/50) in a range from 1.50 to 1.90 W/kg and a magnetic flux density (B50) in a range from 1.65 to 1.80 T.

In addition, the non-oriented electrical steel sheet according to Embodiment 2 of the present disclosure may have a tensile strength in a range from 350 to 540 N/mm$^2$ and a hardness in a range from 200 to 270 Hv.

Technical Effects

The non-oriented electrical steel sheet and the method for manufacturing the same according to the present disclosure may exhibit the low iron loss properties while lowering the temperature by strictly controlling the content ratios of Si, Al, and the like, lowering the heat-treatment temperatures in the decarburization annealing heat-treatment and the final annealing heat-treatment, and adjusting the gas atmosphere.

In addition, the non-oriented electrical steel sheet and the method for manufacturing the same according to the present disclosure may reduce the process cost by lowering the decarburization annealing heat-treatment temperature to the temperature in the range from 780 to 920° C., more preferably in the range from 780 to 820° C., and may lower the defect rate by reducing the degree of risk of the oxidation.

As a result, the non-oriented electrical steel sheet and the method for manufacturing the same according to the present disclosure may secure the iron loss (W15/50) in the range from 1.65 to 2.15 W/kg and the magnetic flux density (B50) in the range from 1.65 to 1.80 T even at the low temperature by adjusting the temperatures and the gas atmospheres of the decarburization annealing heat-treatment and the final annealing heat-treatment to optimize the texture of the electrical steel sheet after the cold rolling.

In addition, according to the present disclosure, instead of performing the final annealing heat-treatment process that is performed at the high temperature equal to or higher than 1,000° C. after the cold rolling, the recrystallization heat-treatment is performed at the low temperature equal to or lower than 900° C., and the final heat-treatment is performed at the high temperature equal to or higher than 900° C. after processing the steel sheet into the parts for the motor, thereby improving the magnetic properties of the electrical steel sheet while increasing the strength in the (100) direction.

As a result, the non-oriented electrical steel sheet and the method for manufacturing the same according to the present disclosure may perform the recrystallization heat-treatment at the low temperature equal to or lower than 900° C. after the cold rolling, thereby increasing the strength of the (100)-plane, which is the crystalline structure of the non-oriented electrical steel sheet, and accordingly, improving the magnetic properties.

In addition, the non-oriented electrical steel sheet and the method for manufacturing the same according to the present disclosure may lower the recrystallization heat-treatment temperature to the temperature in the range from 750 to 850° C. and allowing the final heat-treatment to be performed at the temperature in the range from 900 to 1,100° C. for the reduced duration in the range from 1 to 30 minutes, thereby reducing the iron loss while reducing the process cost.

As a result, the non-oriented electrical steel sheet according to the present disclosure has the iron loss (W15/50) in the range from 1.50 to 1.90 W/kg and the magnetic flux density (B50) in the range from 1.65 to 1.80 T.

In addition, the non-oriented electrical steel sheet according to the present disclosure has the tensile strength in the range from 350 to 540 $N/mm^2$ and the hardness in the range from 200 to 270 Hv.

In addition, the non-oriented electrical steel sheet and the method for manufacturing the same according to the present disclosure secure the excellent magnetic properties by improving the aggregate structure of the (100)-plane having the excellent magnetic properties, so that it is suitable for the non-oriented electrical steel sheet to be used as the iron core for the linear compressor motor, the air conditioner compressor motor, and the high-speed motor for the vacuum cleaner.

In addition to the above-described effects, specific effects of the present disclosure will be described together while describing specific details for carrying out the disclosure below.

DETAILED DESCRIPTIONS

Figure 1:
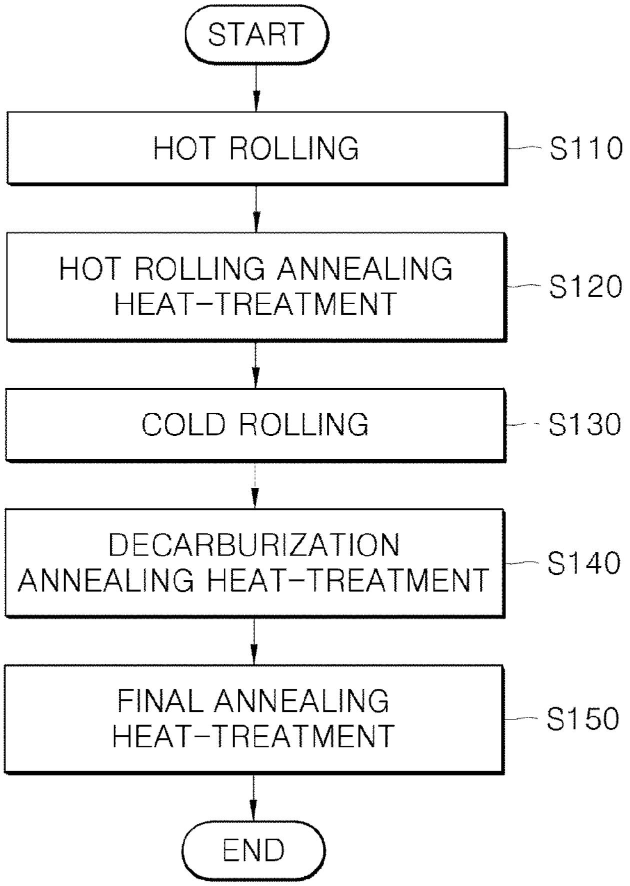
FIG. 1 is a process flowchart showing a method for manufacturing a non-oriented electrical steel sheet according to Embodiment 1 of the present disclosure.

The above objects, features, and advantages will be described in detail later with reference to the accompanying drawings. Accordingly, a person having ordinary knowledge in the technical field to which the present disclosure belongs will be able to easily implement the technical idea of the present disclosure. In describing the present disclosure, when it is determined that a detailed description of a known technology related to the present disclosure may unnecessarily obscure the gist of the present disclosure, the detailed description will be omitted. Hereinafter, preferred embodiments according to the present disclosure will be described in detail with reference to the accompanying drawings. In the drawings, the same reference numerals are used to indicate the same or similar components.

As used herein, the singular constitutes "a" and "an" are intended to include the plural constitutes as well, unless the context clearly indicates otherwise. In this application, terms such as "composed of" or "include" should not be construed as necessarily including all of various components or steps described herein, but should be construed that some components or steps among those may not be included or additional components or steps may be further included.

Hereinafter, a non-oriented electrical steel sheet and a method for manufacturing the same according to some embodiments of the present disclosure will be described.

Embodiment 1

In general, the non-oriented electrical steel sheet is manufactured in an order of a hot rolling, a hot rolling annealing heat-treatment, a cold rolling, a decarburization annealing heat-treatment, and a final annealing heat-treatment.

In this regard, each of the decarburization annealing heat-treatment and the final annealing heat-treatment is performed in an $H_2$ gas atmosphere at a temperature equal to or higher than 1,000° C. In general, only when the heat-treatment is performed in the $H_2$ gas atmosphere, the heat-treatment is possible while maintaining a reducing atmosphere to reduce oxidation.

However, when each of the decarburization annealing heat-treatment and the final annealing heat-treatment is performed at the temperature equal to or higher than 1,000° C., not only a degree of risk of the oxidation is high, but also a process cost increases because of application of the high-temperature process.

To solve such problems, in Embodiment 1 of the present disclosure, after the cold rolling, the temperatures and the atmospheres of the decarburization annealing heat-treatment and the final annealing heat-treatment are adjusted to optimize a texture of the electrical steel sheet, so that an electrical steel sheet with low iron loss may be manufactured even at a low temperature.

That is, in Embodiment 1 of the present disclosure, when the decarburization annealing heat-treatment is performed in the $H_2$ gas atmosphere, the temperature of the decarburization annealing heat-treatment is lowered from the temperature equal to or higher than 1,000° C. to a temperature in a range from 780 to 920° C., more preferably in a range from 780 to 820° C. to increase a fraction of non-recrystallized grains to increase a possibility of texture change, and the final annealing heat-treatment is performed in an Ar gas atmosphere at a temperature in a range from 980 to 1,020° C. Therefore, an electrical steel sheet that is cost-effective and has the low iron loss may be manufactured.

To this end, the non-oriented electrical steel sheet according to Embodiment 1 of the present disclosure contains C: equal to or smaller than 0.05 wt %, Si: in a range from 1.0 to 3.5 wt %, Al: in a range from 0.2 to 0.6 wt %, Mn: in a range from 0.02 to 0.20 wt %, P: in a range from 0.01 to 0.20 wt %, S: equal to or smaller than 0.01 wt %, and Fe as a remainder, and unavoidable impurities, and has the iron loss (W15/50) in a range from 1.65 to 2.15 W/kg and a magnetic flux density (B50) in a range from 1.65 to 1.80 T.

In this regard, the non-oriented electrical steel sheet according to Embodiment 1 of the present disclosure preferably has the iron loss (W15/50) in a range from 1.70 to 1.90 W/kg and the magnetic flux density (B50) in a range from 1.65 to 1.80 T.

In addition, the non-oriented electrical steel sheet according to Embodiment 1 of the present disclosure may further contain at least one of Cu: equal to or smaller than 0.03 wt %, Ni: equal to or smaller than 0.03 wt %, and Cr: equal to or smaller than 0.05 wt %.

In this regard, the non-oriented electrical steel sheet according to Embodiment 1 of the present disclosure preferably has a thickness in a range from 0.05 to 0.50 mm. When the thickness of the non-oriented electrical steel sheet is smaller than 0.05 mm, it is not preferable because it may cause shape defects when the non-oriented electrical steel sheet is used as an iron core for a linear compressor motor, an air conditioner compressor motor, and a high-speed motor for a vacuum cleaner. Conversely, when the thickness of the non-oriented electrical steel sheet exceeds 0.50 mm, it is not preferable because a large amount of aggregate structure of a (100)-plane is not be able to be secured and thus the magnetic flux density deteriorates.

In addition, the non-oriented electrical steel sheet according to Embodiment 1 of the present disclosure has a tensile strength in a range from 400 to 560 $N/mm^2$ and a hardness in a range from 200 to 270 Hv.

Hereinafter, a role and a content of each component contained in the non-oriented electrical steel sheet according to Embodiment 1 of the present disclosure will be described.

Carbon (C)

When a large amount of carbon (C) is added, an austenite area is expanded to increase a phase transformation section, and inhibits a crystal grain growth of ferrite during the final annealing heat-treatment to increase the iron loss. In addition, because carbon (C) increases the iron loss because of magnetic aging when used after being processed into an electrical product from a final product, it is preferable to control a content ratio of carbon to be equal to or smaller than 0.05 wt %.

Silicon (Si)

Silicon (Si) is added to increase a specific resistance to lower eddy current loss of the iron loss.

Silicon (Si) is preferably added in a content ratio from 1.0 to 3.5 wt % of a total weight of the non-oriented electrical steel sheet according to Embodiment 1 of the present disclosure, and a range from 2.5 to 3.2 wt % is able to be presented as a more preferable range. When a small amount, such as smaller than 1.0 wt %, of silicon (Si) is added, it is difficult to obtain the low iron loss properties and it is difficult to improve magnetic permeability in a rolling direction. In addition, excessive addition of silicon (Si) in excess of 3.5 wt % may cause a decrease in the magnetic flux density, resulting in a decrease in torque of the motor or an increase in copper loss, and cracks or plate breakage may occur during the cold rolling because of an increase in brittleness.

Aluminum (Al)

Aluminum (Al), together with silicon (Si), contributes to lowering the iron loss of the non-oriented electrical steel sheet.

Aluminum (Al) is preferably added in a content ratio in a range from 0.2 to 0.6 wt % of the total weight of the non-oriented electrical steel sheet according to Embodiment 1 of the present disclosure, and a range from 0.3 to 0.5 wt % is able to be presented as a more preferable range. When the amount of aluminum (Al) added is smaller than 0.2 wt %, it is difficult to sufficiently exert an effect of the addition. Conversely, excessive addition of aluminum (Al) in excess of 0.6 wt % may cause the decrease in the magnetic flux density, resulting in the decrease in the torque of the motor or the increase in the copper loss.

Manganese (Mn)

Manganese (Mn) lowers a solid solution temperature of precipitates during reheating and plays a role in preventing cracks occurred at both distal ends of a material during the hot rolling.

Manganese (Mn) is preferably added in a content ratio from 0.02 to 0.20 wt % of the total weight of the non-oriented electrical steel sheet according to Embodiment 1 of the present disclosure. When the amount of manganese (Mn) added is smaller than 0.02 wt %, a risk of defects resulted from the cracks during the hot rolling increases. Conversely, when the amount of manganese (Mn) added exceeds 0.20 wt %, a roll load increases and cold-rollability deteriorates, which is not preferable.

Phosphorus (P)

Phosphorus (P) increases the specific resistance to lower the iron loss.

Phosphorus (P) is preferably added in a content ratio from 0.01 to 0.20 wt % of the total weight of the non-oriented electrical steel sheet according to Embodiment 1 of the present disclosure. When the amount of phosphorus (P) added is smaller than 0.01 wt %, crystal grains are excessively increased and thus a magnetic deviation is increased. Conversely, excessive addition of phosphorus (P) in excess of 0.20 wt % may cause the decrease in the cold-rollability, which is not preferable.

Sulfur (S)

Sulfur (S) has a tendency to react with manganese (Mn) and form fine precipitates, MnS, to inhibit the crystal grain growth, so that it is preferable to control sulfur to have the smallest amount possible. Therefore, the content ratio of sulfur (S) is preferably controlled to be equal to or smaller than 0.01 wt % of the total weight of the non-oriented electrical steel sheet according to Embodiment 1 of the present disclosure.

Copper (Cu)

Copper (Cu) is added because it improves the aggregate structure, suppresses fine CuS precipitations, and resists the oxidation and corrosion. However, excessive addition of copper (Cu) in excess of 0.03 wt % may cause fining on a surface of the steel sheet, which is not preferable. Therefore, it is preferable to control the content ratio of copper (Cu) to be equal to or smaller than 0.03 wt % of the total weight of the non-oriented electrical steel sheet according to Embodiment 1 of the present disclosure.

Nickel (Ni)

Nickel (Ni) is added because it improves the aggregate structure, suppresses precipitations of S into the fine CuS by being added together with Cu, and resists the oxidation and the corrosion. However, when the amount of nickel (Ni) added exceeds 0.03 wt %, the effect of improving the aggregate structure is insignificant despite the addition of a large amount, which is uneconomical and thus is not preferable. Therefore, it is preferable to control the content ratio of nickel (Ni) to be equal to or smaller than 0.03 wt % of the total weight of the non-oriented electrical steel sheet according to Embodiment 1 of the present disclosure.

Chromium (Cr)

Chromium (Cr) serves to increase the specific resistance to reduce the iron loss while not increasing a strength of the material. However, excessive addition of chromium (Cr) in excess of 0.05 wt % may cause promotion of a development of the aggregate structure that is unfavorable to magnetism, resulting in the decrease in the magnetic flux density.

Therefore, it is preferable to strictly control the content ratio of chromium (Cr) to be equal to or smaller than 0.05 wt % of the total weight of the non-oriented electrical steel sheet according to Embodiment 1 of the present disclosure.

Hereinafter, a method for manufacturing the non-oriented electrical steel sheet according to Embodiment 1 of the present disclosure will be described with reference to the accompanying drawings.

FIG. 1 is a process flowchart showing a method for manufacturing a non-oriented electrical steel sheet according to Embodiment 1 of the present disclosure.

As shown in FIG. 1, the method for manufacturing the non-oriented electrical steel sheet according to Embodiment 1 of the present disclosure includes a hot rolling (S110), a hot rolling annealing heat-treatment (S120), a cold rolling (S130), a decarburization annealing heat-treatment (S140), and a final annealing heat-treatment (S150).

Hot Rolling

In the hot rolling (S110), steel slab containing C: equal to or smaller than 0.05 wt %, Si: in the range from 1.0 to 3.5 wt %, Al: in the range from 0.2 to 0.6 wt %, Mn: in the range from 0.02 to 0.20 wt %, P: in the range from 0.01 to 0.20 wt %, S: equal to or smaller than 0.01 wt %, and Fe as the remainder, and the unavoidable impurities is reheated and then hot-rolled.

In this regard, the steel slab may further contain at least one of Cu: equal to or smaller than 0.03 wt %, Ni: equal to or smaller than 0.03 wt %, and Cr: equal to or smaller than 0.05 wt %.

In the present step, to facilitate the hot rolling in the process of charging the steel slab having the above composition into a heating furnace and reheating the steel slab, it is preferable to perform the reheating of the steel at a temperature equal to or higher than 1,050° C. However, when the reheating temperature of the steel exceeds 1,250° C., the precipitates such as MnS harmful to the iron loss properties are re-dissolved, and the fine precipitates tend to be excessively generated after the hot rolling. Such fine precipitates are not preferable because they inhibit the crystal grain growth and deteriorate the iron loss properties. Therefore, the reheating is preferably performed at a temperature in a range from 1,050 to 1,250° C. for 1 to 3 hours.

In addition, in the present step, finishing hot rolling is preferably performed under a condition of a temperature in a range from 800 to 950° C. to prevent excessive generation of an oxide layer on the hot-rolled steel sheet.

In this regard, the hot-rolled steel sheet may be cooled in a coil state in the air after being wound at a temperature in a range from 650 to 800° C. such that the oxide layer is not excessively generated and the grain growth is not inhibited.

Hot Rolling Annealing Heat-Treatment

In the hot rolling annealing heat-treatment (S120), the hot-rolled steel sheet is subjected to the hot rolling annealing heat-treatment and is pickled.

Such hot rolling annealing heat-treatment is performed for the purpose of recrystallizing elongated grains at a center of the hot-rolled steel sheet and inducing uniform distribution of the crystal grains in a thickness direction of the steel sheet.

The hot rolling annealing heat-treatment is preferably performed under a condition of a temperature in a range from 850 to 1,000° C. When the hot rolling annealing heat-treatment temperature is lower than 850° C., uniform crystal grain distribution is not obtained, so that effects of improving the magnetic flux density and reducing the iron loss may be insufficient. Conversely, when the hot rolling annealing heat-treatment temperature exceeds 1,000° C., the magnetic flux density deteriorates because an aggregate structure of a (111)-plane, which is unfavorable to the magnetism, increases.

Cold Rolling

In the cold rolling (S130), the pickled steel sheet is cold-rolled at a reduction percentage equal to or lower than 55%.

In the present step, the cold rolling is final rolling for the steel sheet to have a thickness in a range from 0.05 to 0.50 mm. When the thickness of the cold-rolled steel sheet is smaller than 0.05 mm, it is not preferable because it may cause the shape defects when the steel sheet is used as an iron core for the linear compressor motor, the air conditioner compressor motor, and the high-speed motor for the vacuum cleaner. Conversely, when the thickness of the cold-rolled steel sheet exceeds 0.50 mm, a large amount of aggregate structure of the (100)-plane is not able to be secured, and thus, the magnetic flux density deteriorates, which is not preferable.

In the present step, the cold rolling is preferably performed at the reduction percentage equal to or lower than 55%, more preferably in a range from 45 to 50%. When the reduction percentage of the cold rolling exceeds 55%, the aggregate structure of the (111)-plane is excessively developed and a fraction of the aggregate structure of the (111)-plane with excellent magnetic properties is reduced.

Therefore, to improve the magnetic properties by suppressing the generation of the aggregate structure of the (111)-plane and increasing the generation of the aggregate structure of the (100)-plane, the reduction percentage in the cold rolling process is preferably strictly controlled to be equal to or lower than 55%.

In this regard, the reduction percentage of the cold rolling corresponds to (initial steel sheet thickness−final steel sheet thickness)/(initial steel sheet thickness)×100. In this regard, the initial steel sheet is a hot-rolled steel sheet, and the final steel sheet is a cold-rolled steel sheet.

Decarburization Annealing Heat-Treatment

In the decarburization annealing heat-treatment (S140), the cold-rolled steel sheet is subjected to the decarburization annealing heat-treatment under a condition of a temperature in a range from 780 to 920° C.

In the present step, the decarburization annealing heat-treatment is more preferably performed for 1 to 60 minutes in the $H_2$ gas atmosphere under a condition of the temperature in the range from 780 to 820° C.

When the decarburization annealing heat-treatment temperature is lower than 780° C. or the decarburization annealing heat-treatment duration is shorter than 1 minute, carbon diffusion is very slow and thus decarburization is not performed well. Conversely, when the decarburization annealing heat-treatment temperature exceeds 920° C. or the decarburization annealing heat-treatment duration exceeds 60 minutes, the decarburization is also not performed well because of rapid formation of the oxide layer on the surface of the steel sheet, and also the crystal growth occurs coarsely because of rapid heating to cause a non-uniform recrystallized structure and unstable secondary recrystallization.

Final Annealing Heat-Treatment

In the final annealing heat-treatment (S150), the decarburization annealing heat-treated steel sheet is subjected to the final annealing heat-treatment under a condition of a temperature in a range from 980 to 1,020° C.

In the present step, the final annealing heat-treatment is preferably performed for 1 to 30 minutes under a condition of a temperature in a range from 980 to 1,020° C. in the Ar gas atmosphere.

When the final annealing heat-treatment temperature is lower than 980° C. or the final annealing heat-treatment duration is shorter than 1 minute, P and S inside the steel sheet are not able to sufficiently diffuse to the surface of the steel sheet, so that it is difficult to fully exert an effect of enhancing a strength of the (100)-plane. Conversely, when the final annealing heat-treatment temperature exceeds 1,020° C. or the final annealing heat-treatment duration exceeds 30 minutes, the iron loss increases because of an increase in the strength near a Goss texture.

The non-oriented electrical steel sheet according to Embodiment 1 of the present disclosure manufactured by the above processes (S110 to S150) may exhibit the low iron loss properties while lowering the temperature by strictly controlling the content ratios of Si, Al, and the like, lowering the heat-treatment temperatures in the decarburization annealing heat-treatment and the final annealing heat-treatment, and adjusting the gas atmospheres.

In addition, the non-oriented electrical steel sheet manufactured by the method according to Embodiment 1 of the present disclosure may reduce a process cost by lowering the decarburization annealing heat-treatment temperature to the temperature in the range from 780 to 920° C., more preferably in the range from 780 to 820° C., and lower a defect rate by lowering the degree of risk of the oxidation.

As a result, the non-oriented electrical steel sheet manufactured by the method according to Embodiment 1 of the Present Disclosure may secure the iron loss (W15/50) in the range from 1.65 to 2.15 W/kg and the magnetic flux density (B50) in the range from 1.65 to 1.80 T even at the low temperature by adjusting the temperatures and the gas atmospheres of the decarburization annealing heat-treatment and the final annealing heat-treatment to optimize the texture of the electrical steel sheet after the cold rolling.

In addition, the non-oriented electrical steel sheet manufactured by the method according to Embodiment 1 of the present disclosure has the tensile strength in the range from 400 to 560 N/mm and the hardness in the range from 200 to 270 Hv.

Embodiment 2

In general, the non-oriented electrical steel sheet is manufactured in an order of the hot rolling, the hot rolling annealing heat-treatment, the cold rolling, and the final annealing heat-treatment. The non-oriented electrical steel sheet manufactured as such is subjected to insulation coating and processing to be used as parts for the motor (a stator and a rotor), and is subjected to the final heat-treatment to remove stress generated during such processing.

Through such many processes, despite the increase in the process cost based on the manufacturing processes, there is no particular improvement in the final product. In the electrical steel sheet, texture of a metal is important because it may affect the iron loss and the magnetic flux density. There are various factors that affect the texture of the metal, such as an alloy composition of the electrical steel sheet, the reduction percentage, and the heat-treatment conditions. In general, no matter what composition and reduction percentage the steel sheet has, the steel sheet must be used under optimal conditions under certain heat-treatment conditions.

When the cost is reduced via constant heat-treatment and process optimization and the iron loss is reduced by optimizing the texture, a dominant factor in the magnetic properties, in the non-oriented electrical steel sheet, the non-oriented electrical steel sheet that may be utilized as the parts for the motor may be manufactured efficiently compared to the process cost, which may realize high efficiency of the motor.

Therefore, in Embodiment 2 of the present disclosure, a process up to the final heat-treatment after the electrical steel sheet is processed into the parts for the motor is improved to increase a strength of the texture aligned in a direction of facilitating magnetization, and accordingly, the magnetic properties are improved.

That is, in Embodiment 2 of the present disclosure, instead of performing the final annealing heat-treatment process that is performed at the high temperature equal to or higher than 1,000° C. after the cold rolling, a recrystallization heat-treatment is performed at a low temperature equal to or lower than 900° C., and the final heat-treatment is performed at a high temperature equal to or higher than 900° C. after processing the steel sheet into the parts for the motor, thereby improving the magnetic properties of the electrical steel sheet while increasing a strength in a (100) direction.

As such, in Embodiment 2 of the present disclosure, instead of performing the final annealing heat-treatment that is performed at the high temperature equal to or higher than 1,000° C. after the cold rolling, the recrystallization heat-treatment is performed at the low temperature equal to or lower than 900° C., so that the strength of the (100)-plane, which is a crystalline structure of the non-oriented electrical steel sheet, may be increased, and accordingly, the magnetic properties may be improved.

To this end, the non-oriented electrical steel sheet according to Embodiment 2 of the present disclosure contains C: equal to or smaller than 0.05 wt %, Si: in the range from 1.0 to 3.5 wt %, Al: in the range from 0.2 to 0.6 wt %, Mn: in the range from 0.02 to 0.20 wt %, P: in the range from 0.01 to 0.20 wt %, S: equal to or smaller than 0.01 wt %, and Fe as the remainder, and unavoidable impurities, and has an iron loss (W15/50) in a range from 1.50 to 1.90 W/kg and a magnetic flux density (B50) in the range from 1.65 to 1.80 T.

In addition, the non-oriented electrical steel sheet according to Embodiment 2 of the present disclosure may further contain at least one of Cu: equal to or smaller than 0.03 wt %, Ni: equal to or smaller than 0.03 wt %, and Cr: equal to or smaller than 0.05 wt %.

In this regard, the non-oriented electrical steel sheet according to Embodiment 2 of the present disclosure preferably has a thickness in the range from 0.05 to 0.50 mm. When the thickness of the non-oriented electrical steel sheet is smaller than 0.05 mm, it is not preferable because it may cause the shape defects when the non-oriented electrical steel sheet is used as the iron core for the linear compressor motor, the air conditioner compressor motor, and the high-speed motor for the vacuum cleaner. Conversely, when the thickness of the non-oriented electrical steel sheet exceeds 0.50 mm, it is not preferable because a large amount of aggregate structure of the (100)-plane may not be able to be secured and thus the magnetic flux density deteriorates.

In addition, the non-oriented electrical steel sheet according to Embodiment 2 of the present disclosure has a tensile strength in a range from 350 to 540 $N/mm^2$ and a hardness in the range from 200 to 270 Hv.

Hereinafter, a role and a content of each component contained in the non-oriented electrical steel sheet according to Embodiment 2 of the present disclosure will be described.

Carbon (C)

When a large amount of carbon (C) is added, the austenite area is expanded to increase the phase transformation section, and inhibits the crystal grain growth of the ferrite during the final annealing heat-treatment to increase the iron loss. In addition, because carbon (C) increases the iron loss because of the magnetic aging when used after being processed into the electrical product from the final product, it is preferable to control the content ratio of carbon to be equal to or smaller than 0.05 wt %.

Silicon (Si)

Silicon (Si) is added to increase the specific resistance to lower the eddy current loss of the iron loss.

Silicon (Si) is preferably added in the content ratio from 1.0 to 3.5 wt % of a total weight of the non-oriented electrical steel sheet according to Embodiment 2 of the present disclosure, and the range from 2.5 to 3.2 wt % is able to be presented as the more preferable range. When a small amount, such as smaller than 1.0 wt %, of silicon (Si) is added, it is difficult to obtain the low iron loss properties and it is difficult to improve the magnetic permeability in the rolling direction. In addition, the excessive addition of silicon (Si) in excess of 3.5 wt % may cause the decrease in the magnetic flux density, resulting in the decrease in the torque of the motor or the increase in the copper loss, and the cracks or the plate breakage may occur during the cold rolling because of the increase in the brittleness.

Aluminum (Al)

Aluminum (Al), together with silicon (Si), contributes to lowering the iron loss of the non-oriented electrical steel sheet.

Aluminum (Al) is preferably added in the content ratio in the range from 0.2 to 0.6 wt % of the total weight of the non-oriented electrical steel sheet according to Embodiment 2 of the present disclosure, and the range from 0.3 to 0.5 wt % is able to be presented as the more preferable range. When the amount of aluminum (Al) added is smaller than 0.2 wt %, it is difficult to sufficiently exert the effect of the addition. Conversely, the excessive addition of aluminum (Al) in excess of 0.6 wt % may cause the decrease in the magnetic flux density, resulting in the decrease in the torque of the motor or the increase in the copper loss.

Manganese (Mn)

Manganese (Mn) lowers the solid solution temperature of the precipitates during the reheating and plays the role in preventing the cracks occurred at both distal ends of the material during the hot rolling.

Manganese (Mn) is preferably added in the content ratio from 0.02 to 0.20 wt % of the total weight of the non-oriented electrical steel sheet according to Embodiment 2 of the present disclosure. When the amount of manganese (Mn) added is smaller than 0.02 wt %, the risk of defects resulted from the cracks during the hot rolling increases. Conversely, when the amount of manganese (Mn) added exceeds 0.20 wt %, the roll load increases and the cold-rollability deteriorates, which is not preferable.

Phosphorus (P)

Phosphorus (P) increases the specific resistance to lower the iron loss.

Phosphorus (P) is preferably added in the content ratio from 0.01 to 0.20 wt % of the total weight of the non-oriented electrical steel sheet according to Embodiment 2 of the present disclosure. When the amount of phosphorus (P) added is smaller than 0.01 wt %, the crystal grains are excessively increased and thus the magnetic deviation is increased. Conversely, the excessive addition of phosphorus (P) in excess of 0.20 wt % may cause the decrease in the cold-rollability, which is not preferable.

Sulfur (S)

Sulfur (S) has the tendency to react with manganese (Mn) and form the fine precipitates, MnS, to inhibit the crystal grain growth, so that it is preferable to control sulfur to have the smallest amount possible. Therefore, the content ratio of sulfur (S) is preferably controlled to be equal to or smaller than 0.01 wt % of the total weight of the non-oriented electrical steel sheet according to Embodiment 2 of the present disclosure.

Copper (Cu)

Copper (Cu) is added because it improves the aggregate structure, suppresses the fine CuS precipitations, and resists the oxidation and the corrosion. However, the excessive addition of copper (Cu) in excess of 0.03 wt % may cause the fining on the surface of the steel sheet, which is not preferable. Therefore, it is preferable to control the content ratio of copper (Cu) to be equal to or smaller than 0.03 wt % of the total weight of the non-oriented electrical steel sheet according to Embodiment 2 of the present disclosure.

Nickel (Ni)

Nickel (Ni) is added because it improves the aggregate structure, suppresses the precipitations of S into the fine CuS by being added together with Cu, and resists the oxidation and the corrosion. However, when the amount of nickel (Ni) added exceeds 0.03 wt %, the effect of improving the aggregate structure is insignificant despite the addition of a large amount, which is uneconomical and thus is not preferable. Therefore, it is preferable to control the content ratio of nickel (Ni) to be equal to or smaller than 0.03 wt % of the total weight of the non-oriented electrical steel sheet according to Embodiment 2 of the present disclosure.

Chromium (Cr)

Chromium (Cr) serves to increase the specific resistance to reduce the iron loss while not increasing the strength of the material. However, the excessive addition of chromium (Cr) in excess of 0.05 wt % may cause the promotion of the development of the aggregate structure that is unfavorable to the magnetism, resulting in the decrease in the magnetic flux density. Therefore, it is preferable to strictly control the content ratio of chromium (Cr) to be equal to or smaller than 0.05 wt % of the total weight of the non-oriented electrical steel sheet according to Embodiment 2 of the present disclosure.

Hereinafter, a method for manufacturing the non-oriented electrical steel sheet according to Embodiment 2 of the present disclosure will be described with reference to the accompanying drawings.

Figure 2:
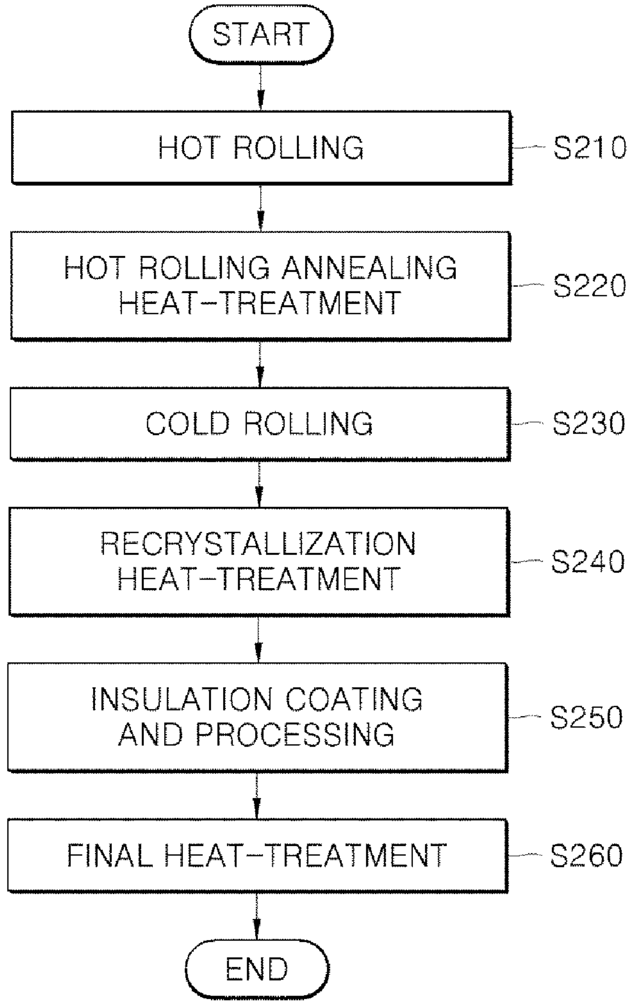
FIG. 2 is a process flowchart showing a method for manufacturing a non-oriented electrical steel sheet according to Embodiment 2 of the present disclosure.

FIG. 2 is a process flowchart showing a method for manufacturing an non-oriented electrical steel sheet according to Embodiment 2 of the present disclosure.

As shown in FIG. 2, the method for manufacturing the non-oriented electrical steel sheet according to Embodiment 2 of the present disclosure includes a hot rolling (S210), a hot rolling annealing heat-treatment (S220), a cold rolling (S230), a recrystallization heat-treatment (S240), an insulation coating and processing (S250), and a final heat-treatment (S260).

Hot Rolling

In the hot rolling (S210), steel slab containing C: equal to or smaller than 0.05 wt %, Si: in the range from 1.0 to 3.5 wt %, Al: in the range from 0.2 to 0.6 wt %, Mn: in the range from 0.02 to 0.20 wt %, P: in the range from 0.01 to 0.20 wt %, S: equal to or smaller than 0.01 wt %, and Fe as the remainder, and the unavoidable impurities is reheated and then hot-rolled.

In this regard, the steel slab may further contain at least one of Cu: equal to or smaller than 0.03 wt %, Ni: equal to or smaller than 0.03 wt %, and Cr: equal to or smaller than 0.05 wt %.

In the present step, to facilitate the hot rolling in the process of charging the steel slab having the above composition into the heating furnace and reheating the steel slab, it is preferable to perform the reheating of the steel at the temperature equal to or higher than 1,050° C. However, when the reheating temperature of the steel exceeds 1,250° C., the precipitates such as MnS harmful to the iron loss properties are re-dissolved, and the fine precipitates tend to be excessively generated after the hot rolling. Such fine precipitates are not preferable because they inhibit the crystal grain growth and deteriorate the iron loss properties. Therefore, the reheating is preferably performed at the temperature in the range from 1,050 to 1,250° C. for 1 to 3 hours.

In addition, in the present step, the finishing hot rolling is preferably performed under a condition of the temperature in the range from 800 to 950° C. to prevent the excessive generation of the oxide layer on the hot-rolled steel sheet.

In this regard, the hot-rolled steel sheet may be cooled in the coil state in the air after being wound at the temperature in the range from 650 to 800° C. such that the oxide layer is not excessively generated and the crystal grain growth is not inhibited.

Hot Rolling Annealing Heat-Treatment

In the hot rolling annealing heat-treatment (S220), the hot-rolled steel sheet is subjected to the hot rolling annealing heat-treatment and is pickled.

Such hot rolling annealing heat-treatment is performed for the purpose of recrystallizing the elongated grains at the center of the hot rolled steel sheet and inducing the uniform distribution of the crystal grains in the thickness direction of the steel sheet.

The hot rolling annealing heat-treatment is preferably performed under a condition of the temperature in the range from 850 to 1,000° C. When the hot rolling annealing heat-treatment temperature is lower than 850° C., the uniform crystal grain distribution is not obtained, so that the effects of improving the magnetic flux density and reducing the iron loss may be insufficient. Conversely, when the hot rolling annealing heat-treatment temperature exceeds 1,000° C., the magnetic flux density deteriorates because the aggregate structure of the (111)-plane, which is unfavorable to the magnetism, increases.

Cold Rolling

In the cold rolling (S230), the pickled steel sheet is cold-rolled at the reduction percentage equal to or lower than 55%.

In the present step, the cold rolling is final rolling for the steel sheet to have the thickness in the range from 0.05 to 0.50 mm. When the thickness of the cold-rolled steel sheet is smaller than 0.05 mm, it is not preferable because it may cause the shape defects when the steel sheet is used as the iron core for the linear compressor motor, the air conditioner compressor motor, and the high-speed motor for the vacuum cleaner. Conversely, when the thickness of the cold-rolled steel sheet exceeds 0.50 mm, a large amount of aggregate structure of the (100)-plane is not able to be secured, and thus, the magnetic flux density deteriorates, which is not preferable.

In the present step, the cold rolling is preferably performed at the reduction percentage equal to or lower than 55%, more preferably in the range from 45 to 50%. When the reduction percentage of the cold rolling exceeds 55%, the aggregate structure of the (111)-plane is excessively developed and the fraction of the aggregate structure of the (111)-plane with the excellent magnetic properties is reduced.

Therefore, to improve the magnetic properties by suppressing the generation of the aggregate structure of the (111)-plane and increasing the generation of the aggregate structure of the (100)-plane, the reduction percentage in the cold rolling process is preferably strictly controlled to be equal to or lower than 55%.

Recrystallization Heat-Treatment

In the recrystallization heat-treatment (S240), the cold-rolled steel sheet is subjected to the recrystallization heat-treatment under a condition of a temperature in a range from 700 to 900° C.

Such recrystallization heat-treatment is more preferably performed at a temperature in a range from 750 to 850° C. for 1 to 60 minutes. In the present disclosure, with introduction of the recrystallization heat-treatment, the steel sheet may have mechanical strength for the processing to be performed without straining a mold during the insulation coating and the processing after the cold rolling. Further, the steel sheet may be controlled to have a recrystallization rate in a range from 20 to 50 vol %, so that when crystal grains that have undergone partial recrystallization and recovery are heat-treated at a high temperature in the future, a possibility of growing in the (100) direction may be increased.

When the recrystallization heat-treatment temperature is lower than 700° C. or the recrystallization heat-treatment duration is shorter than 1 minute, it is difficult to secure the mechanical strength, and thus, the processing in the mold during the insulation coating and the processing may not be possible. Conversely, when the recrystallization heat-treatment temperature exceeds 900° C. or the recrystallization heat-treatment duration exceeds 60 minutes, the mechanical strength may become higher than necessary because of the recrystallization rate exceeding 50 vol % resulted from excessive heat-treatment, so that the strain may be applied to the mold during the insulation coating and the processing.

Insulation Coating and Processing

In the insulation coating and processing (S250), the recrystallization heat-treated steel sheet is insulation-coated and then processed.

In this regard, the insulation coating is a treatment with organic, inorganic and organic-inorganic composite films or coating of other insulating films. In addition, the processing may be performed in the mold to manufacture the steel sheet into parts for a specific type of motor, but may not be limited thereto.

Final Heat-Treatment

In the final heat-treatment (S260), the processed steel sheet is subjected to the final heat-treatment under a condition of a temperature in a range from 900 to 1,100° C.

In this regard, the final heat-treatment is preferably performed for 1 to 30 minutes.

When the final heat-treatment temperature is lower than 900° C. or the final heat-treatment duration is shorter than 1 minute, it is difficult to change structures remaining as the non-recrystallized structures in the (100) direction during the recrystallization heat-treatment, so that difficulties may arise in reducing the iron loss. Conversely, when the final heat-treatment temperature exceeds 1,100° C. or the final heat-treatment duration exceeds 30 minutes, it is not economical because it may act as a factor that only increases the manufacturing cost and the duration without further increasing the effect.

The non-oriented electrical steel sheet according to Embodiment 2 of the present disclosure manufactured by the above processes (S210 to S260) improves the magnetic properties of the electrical steel sheet while increasing the strength in the (100) direction by performing the recrystallization heat-treatment at the low temperature equal to or lower than 900° C. after the cold rolling instead of performing the final annealing heat-treatment performed at the high temperature equal to or higher than 1,000° C., and performing the final heat-treatment at the high temperature equal to or higher than 900° C. after processing the steel sheet into the parts for the motor.

As a result, the non-oriented electrical steel sheet manufactured by the method according to Embodiment 2 of the present disclosure may increase the strength of the (100)-plane, which is the crystalline structure of the non-oriented electrical steel sheet, and thus, improve the magnetic properties by performing the recrystallization heat-treatment at the low temperature equal to or lower than 900° C. after the cold rolling.

In addition, the non-oriented electrical steel sheet manufactured by the method according to Embodiment 2 of the present disclosure may reduce the iron loss while reducing the process cost by lowering the recrystallization heat-treatment temperature to the temperature in the range from 750 to 850° C., and allowing the final heat-treatment duration to be performed at the temperature in the range from 900 to 1,100° C. for the reduced duration in the range from 1 to 30 minutes.

As a result, the non-oriented electrical steel sheet manufactured by the method according to Embodiment 2 of the Present Disclosure may have the iron loss (W15/50) in the range from 1.50 to 1.90 W/kg and the magnetic flux density (B50) in the range from 1.65 to 1.80 T.

In addition, the non-oriented electrical steel sheet manufactured by the method according to Embodiment 2 of the present disclosure has the tensile strength in the range from 350 to 540 N/mm and the hardness in the range from 200 to 270 Hv.

In addition, the non-oriented electrical steel sheet and the method for manufacturing the same according to Embodiment 2 of the present disclosure secure the excellent magnetic properties by improving the aggregate structure of the (100)-plane, which has the excellent magnetic properties, so that it is suitable for the non-oriented electrical steel sheet to be used as the iron core for the linear compressor motor, the air conditioner compressor motor, and the high-speed motor for the vacuum cleaner.

Present Examples

Hereinafter, a configuration and an operation of the present disclosure will be described in more detail with preferred embodiments of the present disclosure. However, this is presented as a preferred example of the present disclosure and is not able to be construed as limiting the present disclosure in any way.

Contents not described herein may be technically inferred by those skilled in the art, so that a description thereof will be omitted.

1. Specimen Manufacture

Specimens were manufactured according to Present Examples 1 to 3 and Comparative Examples 1 to 5 with compositions shown in Table 1 and process conditions shown in Table 2. In this regard, the specimens according to Present Examples 1 to 3 and Comparative Examples 1 to 5 were manufactured by reheating the steel slabs having the compositions shown in Table 1 at 1,150° C., then performing the finishing hot rolling on the steel slabs at 860° C., then performing the hot rolling annealing heat-treatment on the steel slabs at 910° C., then performing the cold rolling on the steel slabs at the reduction percentage of 50%, and then performing the decarburization annealing heat-treatment and the final annealing heat-treatment under the conditions described in Table 2, respectively.

TABLE 1

(Unit: wt %)

| Division | C | Si | Al | Mn | P | Cu (ppm) | Ni (ppm) | Cr (ppm) | S (ppm) | Fe |
|---|---|---|---|---|---|---|---|---|---|---|
| Comparative Example 1 | 0.020 | 3.01 | 0.42 | 0.11 | 0.15 | 125 | 75 | 42 | 42 | Bal. |
| Present Example 1 | 0.020 | 3.01 | 0.41 | 0.13 | 0.14 | 106 | 77 | 41 | 43 | Bal. |
| Comparative Example 2 | 0.030 | 3.11 | 0.45 | 0.12 | 0.11 | 116 | 74 | 41 | 40 | Bal. |
| Present Example 2 | 0.020 | 3.11 | 0.42 | 0.14 | 0.12 | — | 71 | 40 | 45 | Bal. |
| Comparative Example 3 | 0.020 | 3.20 | 0.43 | 0.13 | 0.14 | 156 | — | 41 | 43 | Bal. |
| Present Example 3 | 0.020 | 3.10 | 0.41 | 0.13 | 0.11 | 106 | 74 | — | 41 | Bal. |
| Comparative Example 4 | 0.020 | 3.02 | 0.40 | 0.13 | 0.14 | 116 | 77 | 41 | 43 | Bal. |
| Comparative Example 5 | 0.020 | 3.01 | 0.40 | 0.13 | 0.14 | 125 | 77 | 41 | 43 | Bal. |

TABLE 2

| Division | Decarburization annealing heat-treatment atmosphere | Decarburization annealing heat-treatment temperature (° C.) | Decarburization annealing heat-treatment duration (mn) | Final annealing heat-treatment atmosphere | Final annealing heat-treatment temperature (° C.) | Final annealing heat-treatment duratioin (nm) |
|---|---|---|---|---|---|---|
| Comparative Example 1 | $H_2$ | 800 | 30 | $H_2$ | 1,000 | 15 |
| Present Example 1 | $H_2$ | 800 | 30 | Ar | 1,000 | 15 |
| Comparative Example 2 | $H_2$ | 850 | 40 | $H_2$ | 1,000 | 10 |
| Present Example 2 | $H_2$ | 850 | 40 | Ar | 1,000 | 10 |
| Comparative Example 3 | $H_2$ | 900 | 20 | $H_2$ | 1,000 | 15 |
| Present Example 3 | $H_2$ | 900 | 20 | Ar | 1,000 | 15 |
| Comparative Example 4 | $H_2$ | 800 | 30 | Ar | 900 | 10 |
| Comparative Example 5 | $H_2$ | 800 | 30 | Ar | 1,100 | 10 |

2. Evaluation of Physical Properties

Table 3 shows measurement results of iron losses and magnetic flux densities of the specimens according to Present Examples 1 to 3 and Comparative Examples 1 to 5, and Table 4 shows measurement results of mechanical property values of the specimens according to Present Examples 1 to 3 and Comparative Examples 1 to 5. In this regard, the iron loss W15/50 is an amount of energy lost as heat or the like when the magnetic flux density of 1.5 Tesla is induced in the iron core at 50 Hz alternating current, and the magnetic flux density B50 is a value induced by an excitation force of 5000 A/m.

TABLE 3

| Division | Iron loss (W/Kg) | | | | | | Magnetic flux density (T) |
|---|---|---|---|---|---|---|---|
| | W10/50 | W10/60 | W10/400 | W15/50 | W15/60 | W15/400 | B50, 50 Hz |
| Comparative Example 1 | 0.76 | 0.96 | 14.01 | 2.08 | 2.61 | 37.65 | 1.68 |
| Present Example 1 | 0.73 | 0.92 | 13.24 | 1.87 | 2.31 | 34.33 | 1.70 |
| Comparative Example 2 | 0.75 | 0.94 | 13.96 | 2.04 | 2.56 | 37.39 | 1.69 |
| Present Example 2 | 0.75 | 0.96 | 14.67 | 2.03 | 2.55 | 37.44 | 1.71 |
| Comparative Example 3 | 0.73 | 0.91 | 13.86 | 1.91 | 2.38 | 35.44 | 1.68 |
| Present Example 3 | 0.82 | 1.04 | 16.11 | 2.11 | 2.64 | 38.64 | 1.70 |
| Comparative Example 4 | 0.77 | 0.95 | 14.3 | 1.92 | 2.40 | 36.25 | 1.69 |
| Comparative Example 5 | 0.86 | 1.09 | 15.88 | 2.09 | 2.49 | 39.48 | 1.68 |

TABLE 4

| Division | Tensile strength ($N/mm^2$) | Yield strength ($N/mm^2$) | Hardness (Hv) |
|---|---|---|---|
| Comparative Example 1 | 550 | 413 | 236 |
| Present Example 1 | 553 | 416 | 241 |
| Comparative Example 2 | 548 | 412 | 235 |
| Present Example 2 | 554 | 417 | 243 |
| Comparative Example 3 | 551 | 412 | 235 |
| Present Example 3 | 552 | 414 | 237 |
| Comparative Example 4 | 549 | 414 | 237 |
| Comparative Example 5 | 552 | 415 | 235 |

As shown in Tables 1 to 4, it may be seen that the specimens according to Present Examples 1 to 3 satisfy both the iron loss (W15/50) in the range from 1.65 to 2.15 W/kg and the magnetic flux density (B50) in the range from 1.65 to 1.80 T, which correspond to target values, despite the decarburization annealing heat-treatment being performed at the low temperature.

In particular, it was identified that Present Example 1 in which the decarburization annealing heat-treatment was performed by lowering the temperature to 800° C. in the $H_2$ gas atmosphere and the final annealing heat-treatment was performed under the condition of 1,000° C. in the Ar gas atmosphere shows the iron loss (W15/50) value of 1.87 W/Kg, which is the lowest value. This is determined to be resulted from the change in the texture caused by the increase in the fraction of the non-recrystallized grains occurred as the decarburization annealing heat-treatment temperature was lowered to 800° C.

In addition, it may be seen that the specimens according to Present Examples 1 to 3 satisfy both the tensile strength in the range from 400 to 560 N/me and the hardness in the range from 200 to 270 Hv, which correspond to target values.

On the other hand, the specimens according to Comparative Examples 1 to 5 satisfy the target values of the tensile strength and the hardness, but the specimens according to Comparative Examples 1 to 3 subjected to the final annealing heat-treatment in the $H_2$ gas atmosphere show a tendency to increase in the iron loss value compared to the specimens according to Present Examples 1 to 3.

In addition, it is determined that, in the specimen according to Comparative Example 4, the iron loss is great because the crystal grains are too small, which is resulted from the final annealing heat-treatment being performed at 900° C.

In addition, it is determined that, in the specimen according to Comparative Example 5, the iron loss is increased because the strength near the Goss texture is increased although the crystal grain size is increased as the final annealing heat-treatment is performed at 1,100° C.

3. Microstructure Analysis

Figure 3:
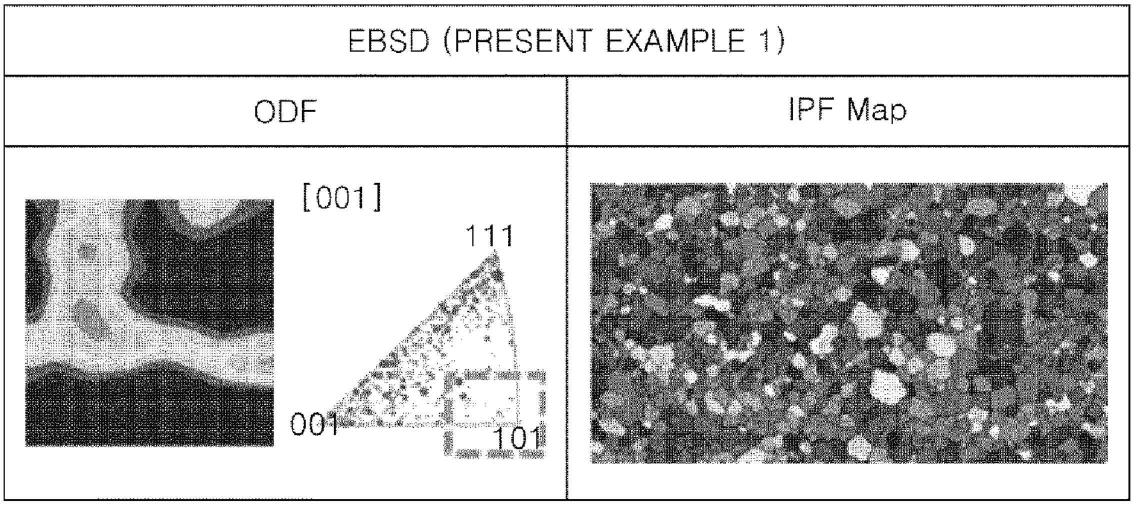
FIG. 3 shows photographs showing results of analysis by ODF and IPF via EBSD measurement of a specimen according to Present Example 1.
Figure 4:
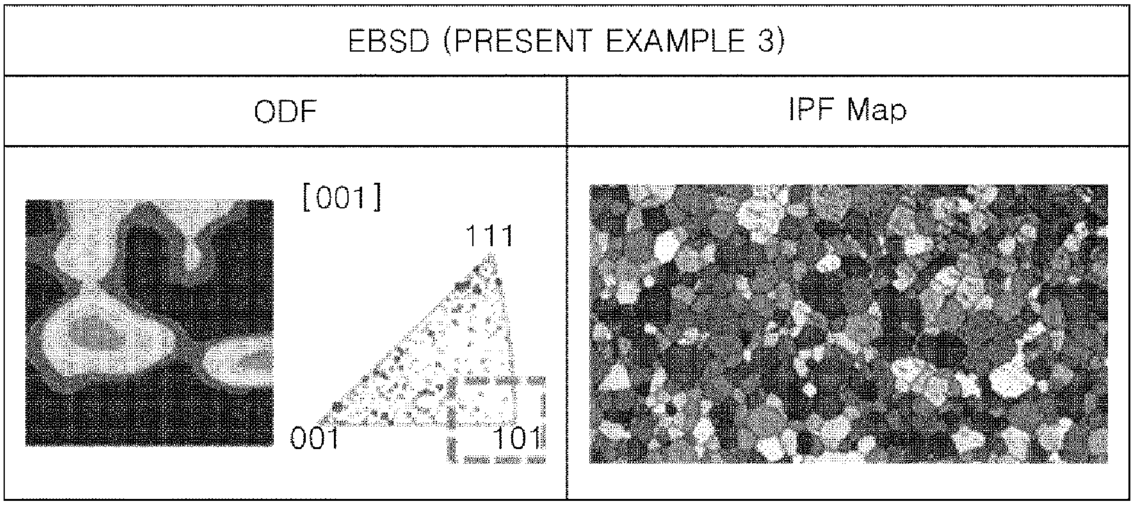
FIG. 4 shows photographs showing results of analysis by ODF and IPF via EBSD measurement of a specimen according to Present Example 3.
Figure 5:
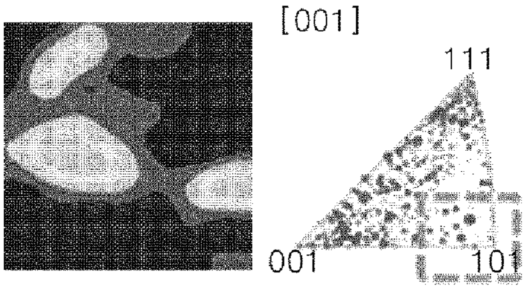
FIG. 5 shows photographs showing results of analysis by ODF and IPF via EBSD measurement of a specimen according to Comparative Example 1.
Figure 5:
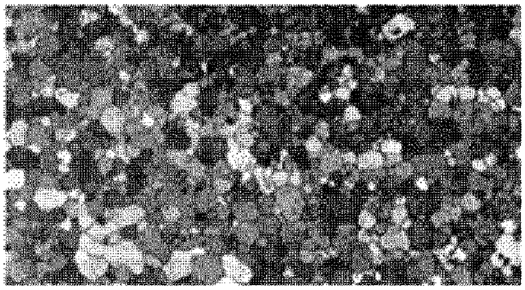
Figure 6:
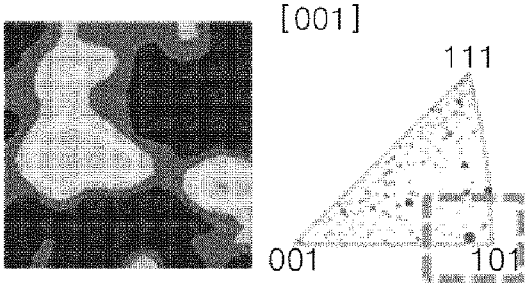
FIG. 6 shows photographs showing results of analysis by ODF and IPF via EBSD measurement of a specimen according to Comparative Example 3.
Figure 6:
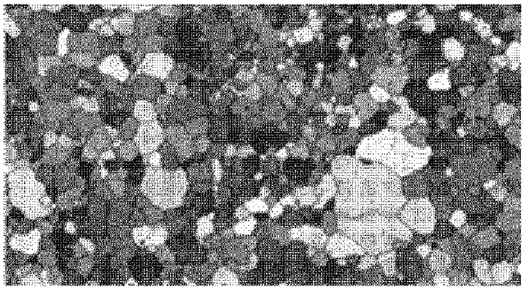

FIG. 3 shows photographs showing results of analysis by ODF and IPF via EBSD measurement of a specimen according to Present Example 1, and FIG. 4 shows photographs showing results of analysis by ODF and IPF via EBSD measurement of a specimen according to Present Example 3. In addition, FIG. 5 shows photographs showing results of analysis by ODF and IPF via EBSD measurement of a specimen according to Comparative Example 1, and FIG. 6 shows photographs showing results of analysis by ODF and IPF via EBSD measurement of a specimen according to Comparative Example 3.

As shown in FIGS. 3 to 6, it may be seen that the atmosphere in the final annealing heat-treatment makes a difference in the formation of the texture of the electrical steel sheet.

As in the specimens according to Present Examples 1 and 3, the texture is distributed in a relatively uniform manner in the $H_2$ gas atmosphere. On the other hand, as in the specimens according to Comparative Examples 1 and 3, in the Ar gas atmosphere, strength around y-fiber and cube texture was great.

In addition, it may be seen that, when the final annealing heat-treatment was performed in the Ar gas atmosphere, the y-fiber was strongly formed in the decarburization annealing heat-treated steel sheet in the $H_2$ gas atmosphere at 900° C. It is thought that the y-fiber was strongly formed in the final annealing heat-treatment because of a difference in the recrystallization, and thus, the increase in the iron loss was occurred.

Figure 7:
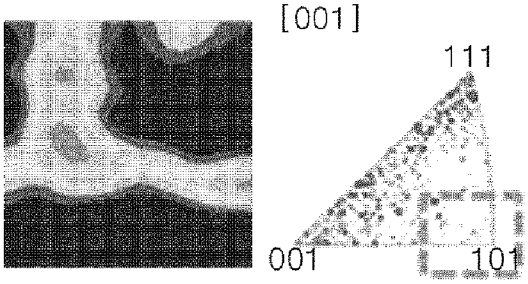
FIG. 7 shows photographs showing results of analysis by ODF and IPF via EBSD measurement of specimens according to Present Example 1 and Comparative Example 5.
Figure 7:
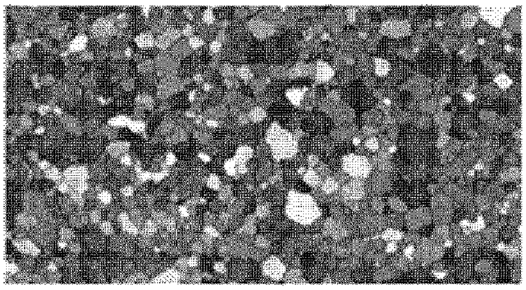
Figure 7:
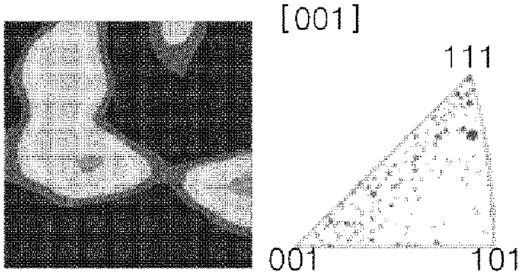
Figure 7:
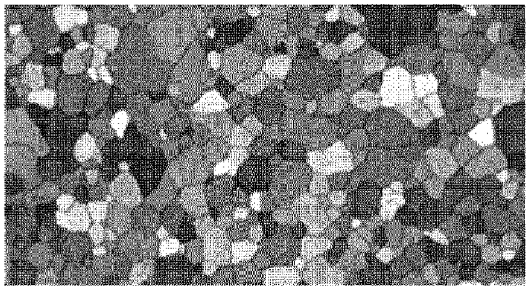

On the other hand, FIG. 7 shows photographs showing results of analysis by ODF and IPF via EBSD measurement of specimens according to Present Example 1 and Comparative Example 5.

As shown in FIG. 7, as may be seen in the specimens according to Present Example 1 and Comparative Example 5, it may be seen that the iron loss properties change by the final annealing heat-treatment temperature even in the Ar gas atmosphere.

That is, it is determined that the iron loss is reduced resulted from the decrease in the crystal gain size in the specimen according to Present Example 1 in which the final annealing heat-treatment was performed at 1,000° C., compared to Comparative Example 5 in which the final annealing heat-treatment was performed at 1,100° C.

On the other hand, it is thought that the iron loss is increased in the specimen according to Comparative Example 5 because the strength near the Goss texture is increased although the grain size is increased as the final annealing heat-treatment is performed at 1,100° C.

As may be seen based on the above experimental results, it was identified that the electrical steel sheet that is cost-effective and has the low iron loss may be manufactured by lowering the decarburization annealing heat-treatment temperature from 1,000° C. to be in the range from 780 to 920° C. to increase the fraction of the non-recrystallized grains to increase the possibility of changing the texture, and performing the final annealing heat-treatment in the Ar gas atmosphere at the temperature in the range from 980 to 1,020° C.

4. Specimen Manufacture

Specimens according to Present Examples 4 to 7 and Comparative Examples 6 to 7 were manufactured with compositions shown in Table 5 and process conditions shown in Table 6.

TABLE 5

(Unit: wt %)

| Division | C | Si | Al | Mn | P | Cu (ppm) | Ni (ppm) | Cr (ppm) | S (ppm) | Fe |
|---|---|---|---|---|---|---|---|---|---|---|
| Present Example 4 | 0.020 | 3.01 | 0.41 | 0.13 | 0.14 | 106 | 77 | 41 | 43 | Bal. |
| Present Example 5 | 0.020 | 3.10 | 0.43 | 0.15 | 0.13 | 106 | 71 | 40 | 45 | Bal. |
| Present Example 6 | 0.020 | 3.05 | 0.41 | 0.13 | 0.14 | 106 | 75 | 40 | 43 | Bal. |
| Present Example 7 | 0.020 | 3.11 | 0.42 | 0.14 | 0.15 | 106 | 75 | 40 | 43 | Bal. |
| Comparative Example 6 | 0.020 | 3.10 | 0.43 | 0.14 | 0.13 | 106 | 75 | 40 | 43 | Bal. |
| Comparative Example 7 | 0.030 | 3.11 | 0.43 | 0.13 | 0.13 | 106 | 75 | 40 | 43 | Bal. |

TABLE 6

| Division | Finishing hot rolling temperature (° C.) | Recrystallization heat-treatment temperature (° C.) | Recrystallization heat-treatment duration (mn) | Final annealing heat-treatment temperature (° C.) | Final annealing heat-treatment duration (mn) | Final heat-treatment temperature (° C.) | Final heat-treatment duration (mn) | Final steel sheet thickness (mm) |
|---|---|---|---|---|---|---|---|---|
| Present Example 4 | 860 | 790 | 30 | — | — | 930 | 20 | 0.20 |

TABLE 6-continued

| Division | Finishing hot rolling temperature (° C.) | Recrystallization heat-treatment temperature (° C.) | Recrystallization heat-treatment duration (mn) | Final annealing heat-treatment temperature (° C.) | Final annealing heat-treatment duration (mn) | Final heat-treatment temperature (° C.) | Final heat-treatment duration (mn) | Final steel sheet thickness (mm) |
|---|---|---|---|---|---|---|---|---|
| Present Example 5 | 860 | 810 | 20 | — | — | 910 | 15 | 0.20 |
| Present Example 6 | 860 | 820 | 30 | — | — | 940 | 10 | 0.35 |
| Present Example 7 | 860 | 810 | 30 | — | — | 920 | 15 | 0.35 |
| Comparative Example 6 | 860 | — | — | 1,050 | 30 | 770 | 120 | 0.20 |
| Comparative Example 7 | 860 | — | — | 1,030 | 20 | 780 | 120 | 0.35 |

5. Evaluation of Physical Properties

Table 7 shows measurement results of iron losses and magnetic flux densities of the specimens according to Present Examples 4 to 7 and Comparative Examples 6 to 7, and Table 8 shows measurement results of mechanical property values of the specimens according to Present Examples 4 to 7 and Comparative Examples 6 to 7. In this regard, the iron loss W15/50 is the amount of energy lost as the heat or the like when the magnetic flux density of 1.5 Tesla is induced in the iron core at the 50 Hz alternating current, and the magnetic flux density B50 is the value induced by the excitation force of 5000 A/m.

TABLE 7

| Division | Iron loss (W/Kg) | | | | | | Magnetic flux density (T) | |
|---|---|---|---|---|---|---|---|---|
| | W10/50 | W10/60 | W10/400 | W15/50 | W15/60 | W15/400 | B25, 50 Hz | B50, 50 Hz |
| Present Example 4 | 0.57 | 0.72 | 9.14 | 1.56 | 1.93 | 23.22 | 1.58 | 1.68 |
| Present Example 5 | 0.58 | 0.74 | 9.16 | 1.57 | 1.95 | 23.31 | 1.57 | 1.69 |
| Present Example 6 | 0.72 | 0.91 | 14.68 | 1.82 | 2.31 | 36.59 | 1.60 | 1.70 |
| Present Example 7 | 0.74 | 0.93 | 14.93 | 1.84 | 2.33 | 36.71 | 1.61 | 1.71 |
| Comparative Example 6 | 0.65 | 0.82 | 12.65 | 1.94 | 2.40 | 32.52 | 1.53 | 1.63 |
| Comparative Example 7 | 0.76 | 0.97 | 17.09 | 2.02 | 2.55 | 45.05 | 1.59 | 1.69 |

TABLE 8

| Division | Tensile strength ($N/mm^2$) | Yield strength ($N/mm^2$) | Hardness (Hv) |
|---|---|---|---|
| Present Example 4 | 527 | 420 | 257 |
| Present Example 5 | 524 | 419 | 264 |
| Present Example 6 | 531 | 421 | 255 |
| Present Example 7 | 526 | 418 | 261 |
| Comparative Example 6 | 532 | 417 | 247 |
| Comparative Example 7 | 529 | 421 | 251 |

As shown in Tables 5 to 8, it may be seen that the specimens according to Present Examples 4 to 7 satisfy both the iron loss (W15/50) in the range from 1.50 to 1.90 W/kg and the magnetic flux density (B50) in the range from 1.65 to 1.80 T, which correspond to target values.

On the other hand, it may be seen that, in the specimens according to Comparative Examples 6 to 7, the magnetic flux densities satisfy the target value, but the iron losses (W15/50) are measured to be higher than the target value.

As may be seen based on the above experimental results, in the specimens according to Present Examples 4 to 7, the iron losses are reduced by about 10% or more and the magnetic flux densities are improved compared to the iron losses and the magnetic flux densities of the specimens according to Comparative Examples 6 to 7.

6. Microstructure Analysis

Figure 8:
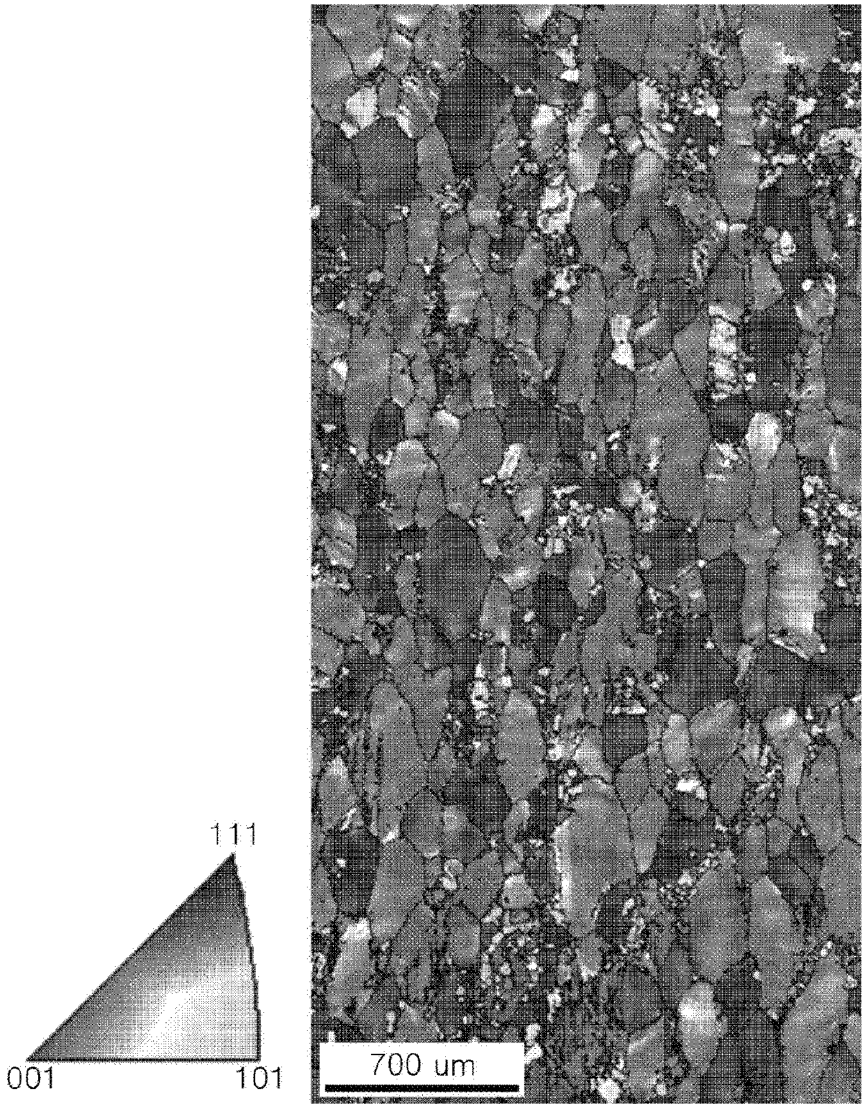
FIG. 8 shows photographs showing a specimen according to Present Example 4.

FIG. 8 shows photographs showing a specimen according to Present Example 4, showing a captured state after performing a recrystallization heat-treatment.

As shown in FIG. 8, it was identified that the specimen according to Present Example 4 has the size of the recrystallized structure equal to or smaller than 20 μm and the non-recrystallized structure of the rate equal to or smaller than 50 vol %.

The specimen according to Present Example 4 may have the mechanical strength for the processing to be performed without straining the mold during the insulation coating and the processing after the cold rolling because of the introduction of the recrystallization heat-treatment. Further, when the crystal grains that have undergone the partial recrystallization and the recovery are heat-treated at the high temperature in the future, the possibility of growing in the (100) direction may be increased.

Figure 9:
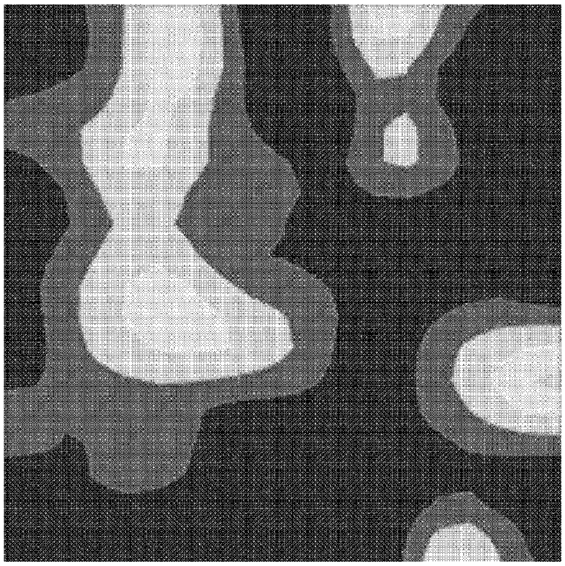
FIG. 9 is a photograph showing results of analysis by ODF via EBSD measurement of a specimen according to Present Example 4.
Figure 10:
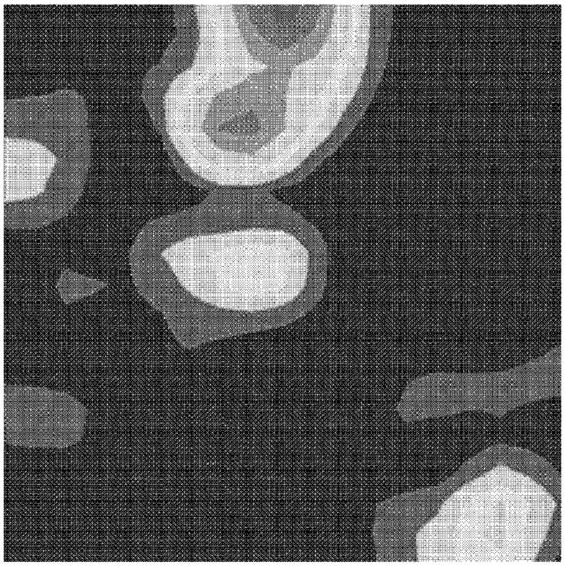
FIG. 10 is a photograph showing results of analysis by ODF via EBSD measurement of a specimen according to Comparative Example 6.

On the other hand, FIG. 9 is a photograph showing results of analysis by ODF via EBSD measurement of a specimen according to Present Example 4, and FIG. 10 is a photograph showing results of analysis by ODF via EBSD measurement of a specimen according to Comparative Example 6.

As shown in FIGS. 9 and 10, it may be seen that, unlike in the specimen according to Comparative Example 6, in the specimen according to Present Example 4, many of the structures remaining as the non-recrystallized structures are changed in the (100) direction during the recrystallization heat-treatment.

As may be seen based on the above experimental results, because the texture of the metal is difficult to change significantly after the recrystallization is completed, two-step processes, that is, the recrystallization heat-treatment and the final heat-treatment are introduced before the recrystallization is completed, so that the strength of (100) at the time of the final recrystallization may be increased.

As described above, the present disclosure has been described with reference to the drawings illustrated, but the present disclosure is not limited by the embodiments disclosed herein and drawings, and it is obvious that various modifications may be made by those skilled in the art within the scope of the technical idea of the present disclosure. In addition, although the operational effects based on the configuration of the present disclosure have not been explicitly described while describing the embodiments of the present disclosure, it is obvious that the effects predictable by the corresponding configuration should also be acknowledged.

REFERENCE NUMERALS

S110: HOT ROLLING
S120: HOT ROLLING ANNEALING HEAT-TREATMENT
S130: COLD ROLLING
S140: FINAL ANNEALING HEAT-TREATMENT
S210: HOT ROLLING
S220: HOT ROLLING ANNEALING HEAT-TREATMENT
S230: COLD ROLLING
S240: RECRYSTALLIZATION HEAT-TREATMENT
S250: INSULATION COATING AND PROCESSING
S260: FINAL HEAT-TREATMENT

What is claimed is:

1. A non-oriented electrical steel sheet comprising:
carbon (C): in a range of 0.02 to 0.05 wt %,
silicon (Si): in a range of 1.0 to 3.5 wt %,
aluminum (Al): in a range of 0.2 to 0.6 wt %,
manganese (Mn): in a range of 0.02 to 0.20 wt %,
phosphorus (P): in a range of 0.11 to 0.14 wt %,
sulfur (S): in a range of more than 0 and not greater than 0.01 wt %,
copper (Cu): in a range of more than 0 and not greater than 0.03 wt %,
nickel (Ni): in a range of more than 0 and not greater than 0.03 wt %,
chromium (Cr): in a range of more than 0 and not greater than 0.05 wt %, and
a remainder of iron (Fe) and unavoidable impurities,
wherein the electrical steel sheet has an iron loss W15/50 in a range of 1.70 to 1.90 W/kg, a magnetic flux density B50 in a range of 1.65 to 1.80 T, a tensile strength in a range of 400 to 560 N/mm$^2$, and a hardness in a range of 200 to 270 HV, and
wherein the electrical steel sheet has a microstructure in which a crystallographic orientation intensity of a (100) plane is higher than a crystallographic orientation intensity of a (111) plane, and P and S are concentrated at a surface portion of the electrical steel sheet.

2. A non-oriented electrical steel sheet comprising:
carbon (C): in a range of 0.02 to 0.05 wt %,
silicon (Si): in a range of 1.0 to 3.5 wt %,
aluminum (Al): in a range of 0.2 to 0.6 wt %,
manganese (Mn): in a range of 0.02 to 0.20 wt %,
phosphorus (P): in a range of 0.13 to 0.15 wt %,
sulfur (S): in a range of more than 0 and not greater than 0.01 wt %,
copper (Cu): in a range of more than 0 and not greater than 0.03 wt %,
nickel (Ni): in a range of more than 0 and not greater than 0.03 wt %,
chromium (Cr): in a range of more than 0 and not greater than 0.05 wt %, and
a remainder of Fe and unavoidable impurities,
wherein the electrical steel sheet has an iron loss W15/50 in a range of 1.56 to 1.84 W/kg, a magnetic flux density B50 in a range of 1.65 to 1.80 T, and a hardness in a range of 255 to 264 HV, and a tensile strength in a range of 350 to 540 N/mm$^2$, and
wherein the electrical steel sheet has a microstructure in which a crystallographic orientation intensity of a (100) plane is higher than a crystallographic orientation intensity of a (111) plane, and P and S are concentrated at a surface portion of the electrical steel sheet.

3. The non-oriented electrical steel sheet of claim 1, wherein the electrical steel sheet has a thickness in a range of 0.05 to 0.50 mm.

4. The non-oriented electrical steel sheet of claim 2, wherein the electrical steel sheet has a thickness in a range of 0.05 to 0.50 mm.

5. A method for manufacturing a non-oriented electrical steel sheet, the method comprising:
reheating and hot rolling a steel slab, the steel slab including:
carbon (C): in a range of 0.02 to 0.05 wt %,
silicon (Si): in a range of 1.0 to 3.5 wt %,
aluminum (Al): in a range of 0.2 to 0.6 wt %,
manganese (Mn): in a range of 0.02 to 0.20 wt %,
phosphorus (P): in a range of 0.11 to 0.14 wt %,
sulfur (S): in a range of more than 0 and not greater than 0.01 wt %,
copper (Cu): in a range of more than 0 and not greater than 0.03 wt %,
nickel (Ni): in a range of more than 0 and not greater than 0.03 wt %,
chromium (Cr): in a range of more than 0 and not greater than 0.05 wt, and
a remainder of iron (Fe) and unavoidable impurities;
performing a hot rolling annealing heat-treatment on the hot-rolled steel sheet and pickling the steel sheet;
cold rolling the pickled steel sheet;
performing a decarburization annealing heat-treatment on the cold-rolled steel sheet at a temperature in a range of 780 to 920° C.; and
performing a final annealing heat-treatment on the decarburization annealing heat-treated steel sheet at a temperature in a range of 980 to 1,020° C.,
wherein the electrical steel sheet has an iron loss W15/50 in a range of 1.70 to 1.90 W/kg and a magnetic flux density in a range of 1.65 to 1.80 T, and a tensile strength in a range of 400 to 560 N/mm$^2$ and a hardness in a range of 200 to 270 HV, and
wherein the electrical steel sheet has a microstructure in which a crystallographic orientation intensity of a (100) plane is higher than a crystallographic orientation intensity of a (111) plane, and P and S are concentrated at a surface portion of the electrical steel sheet.

6. A method for manufacturing a non-oriented electrical steel sheet, the method comprising:
reheating and hot rolling a steel slab, the steel slab including:
carbon (C): in a range of 0.02 to 0.05 wt %,
silicon (Si): in a range of 1.0 to 3.5 wt %,
aluminum (Al): in a range of 0.2 to 0.6 wt %,
manganese (Mn): in a range of 0.02 to 0.20 wt %,
phosphorus (P): in a range of 0.13 to 0.15 wt %,
sulfur (S): in a range of more than 0 and not greater than 0.01 wt %,
copper (Cu): in a range of more than 0 and not greater than 0.03 wt %, nickel (Ni): in a range of more than 0 and not greater than 0.03 wt %, chromium (Cr): in a range of more than 0 and not greater than 0.05 wt %, and a remainder of iron (Fe) and unavoidable impurities;

performing a hot rolling annealing heat-treatment on the hot-rolled steel sheet and pickling the steel sheet;

cold rolling the pickled steel sheet;

performing a recrystallization heat-treatment on the cold-rolled steel sheet at a temperature in a range of 700 to 900° C.;

performing an insulation coating on the recrystallization heat-treated steel sheet and then processing the steel sheet; and performing a final heat-treatment on the processed steel sheet at a temperature in a range of 900 to 1,100° C., wherein the electrical steel sheet has an iron loss W15/50 in a range of 1.56 to 1.84 W/kg, a magnetic flux density B50 in a range of 1.65 to 1.80 T, a hardness in a range of 255 to 264 HV, and a tensile strength in a range of 350 to 540 $N/mm^2$, and wherein the electrical steel sheet has a microstructure in which a crystallographic orientation intensity of a (100) plane is higher than a crystallographic orientation intensity of a (111) plane, and P and S are concentrated at a surface portion of the electrical steel sheet.

7. The method of claim 5, wherein after the cold rolling of the pickled steel sheet, the cold-rolled steel sheet has a thickness in a range of 0.05 to 0.50 mm.

8. The method of claim 5, wherein the decarburization annealing heat-treatment is performed for a duration in a range of 1 to 60 minutes in a hydrogen ($H_2$) gas atmosphere at a temperature in a range of 780 to 820° C.

9. The method of claim 5, wherein the final annealing heat-treatment is performed for a duration in a range of 1 to 30 minutes in an argon (Ar) gas atmosphere.

10. The method of claim 6, wherein the cold-rolled steel sheet has a thickness in a range of 0.05 to 0.50 mm.

11. The method of claim 6, wherein the recrystallization heat-treatment is performed for a duration in a range of 1 to 60 minutes at a temperature in a range of 750 to 850° C.

12. The method of claim 6, wherein the final heat-treatment is performed for a duration in a range of 1 to 30 minutes.

* * * * *